(12) United States Patent
Tait

(10) Patent No.: US 9,606,005 B2
(45) Date of Patent: Mar. 28, 2017

(54) TUBE MONITOR AND PROCESS MEASUREMENT AND CONTROL IN OR FOR A REFORMER

(71) Applicant: METHANEX NEW ZEALAND LIMITED, Auckland (NZ)

(72) Inventor: Peter Campbell Tait, New Plymouth (NZ)

(73) Assignee: METHANEX NEW ZEALAND LIMITED, Auckland (NZ)

( * ) Notice: Subject to any disclaimer, the term of this patent is extended or adjusted under 35 U.S.C. 154(b) by 548 days.

(21) Appl. No.: 14/053,083

(22) Filed: Oct. 14, 2013

(65) Prior Publication Data
US 2014/0105243 A1    Apr. 17, 2014

(30) Foreign Application Priority Data

Oct. 12, 2012    (NZ) .......................... 603007

(51) Int. Cl.
| | |
|---|---|
| G01K 3/00 | (2006.01) |
| G01K 3/04 | (2006.01) |
| G01K 5/50 | (2006.01) |
| B01J 8/06 | (2006.01) |
| B01J 19/00 | (2006.01) |
| B01J 8/00 | (2006.01) |
| G01K 5/56 | (2006.01) |
| C01B 3/38 | (2006.01) |

(52) U.S. Cl.
CPC ............... *G01K 3/04* (2013.01); *B01J 8/001* (2013.01); *B01J 8/062* (2013.01); *B01J 19/0013* (2013.01); *C01B 3/384* (2013.01); *G01K 5/50* (2013.01); *G01K 5/56* (2013.01); *B01J 2208/00097* (2013.01); *B01J 2208/00504* (2013.01); *B01J 2219/00195* (2013.01); *B01J 2219/00213* (2013.01); *B01J 2219/00225* (2013.01); *B01J 2219/00231* (2013.01); *C01B 2203/0233* (2013.01); *C01B 2203/061* (2013.01); *C01B 2203/0811* (2013.01); *C01B 2203/1058* (2013.01); *C01B 2203/1241* (2013.01); *C01B 2203/169* (2013.01); *C01B 2203/1619* (2013.01); *C01B 2203/1695* (2013.01); *G01K 2213/00* (2013.01)

(58) Field of Classification Search
None
See application file for complete search history.

(56) References Cited

U.S. PATENT DOCUMENTS

| | | | |
|---|---|---|---|
| 4,636,969 A | 1/1987 | Kyoden et al. | |
| 5,050,108 A | 9/1991 | Clark et al. | |
| 5,157,619 A | 10/1992 | Palusamy et al. | |
| 5,221,142 A | 6/1993 | Snow | |

(Continued)

FOREIGN PATENT DOCUMENTS

| | | |
|---|---|---|
| JP | 2004-144535 | 5/2004 |
| KR | 1020120033862 | 4/2012 |
| WO | 2011106712 | 9/2011 |

*Primary Examiner* — Erica Lin
(74) *Attorney, Agent, or Firm* — Dann, Dorfman, Herrell and Skillman, P.C.

(57) ABSTRACT

The invention relates to methods and apparatus of measuring real time temperature conditions within a reformer. The data is then used for process control optimization, overheat protection, and improved creep damage and fatigue life prediction.

25 Claims, 2 Drawing Sheets

(56) References Cited

U.S. PATENT DOCUMENTS

| | | | | |
|---|---|---|---|---|
| 5,821,861 | A | * | 10/1998 | Hartog ................... G01K 11/32 |
| | | | | 250/227.18 |
| 2004/0114793 | A1 | * | 6/2004 | Bondurant ........... G01N 21/954 |
| | | | | 382/141 |
| 2007/0180769 | A1 | * | 8/2007 | Bonadies ................ C01B 3/386 |
| | | | | 48/198.7 |
| 2008/0164006 | A1 | * | 7/2008 | Karamanos ........... F24F 1/0059 |
| | | | | 165/67 |
| 2010/0042370 | A1 | * | 2/2010 | Gallarda ................. B01J 8/062 |
| | | | | 702/184 |
| 2010/0278700 | A1 | * | 11/2010 | Clawson ................. B01J 8/062 |
| | | | | 422/198 |
| 2011/0069301 | A1 | | 3/2011 | Marzok et al. |
| 2011/0217607 | A1 | * | 9/2011 | Isom ................ H01M 8/04022 |
| | | | | 429/423 |

* cited by examiner

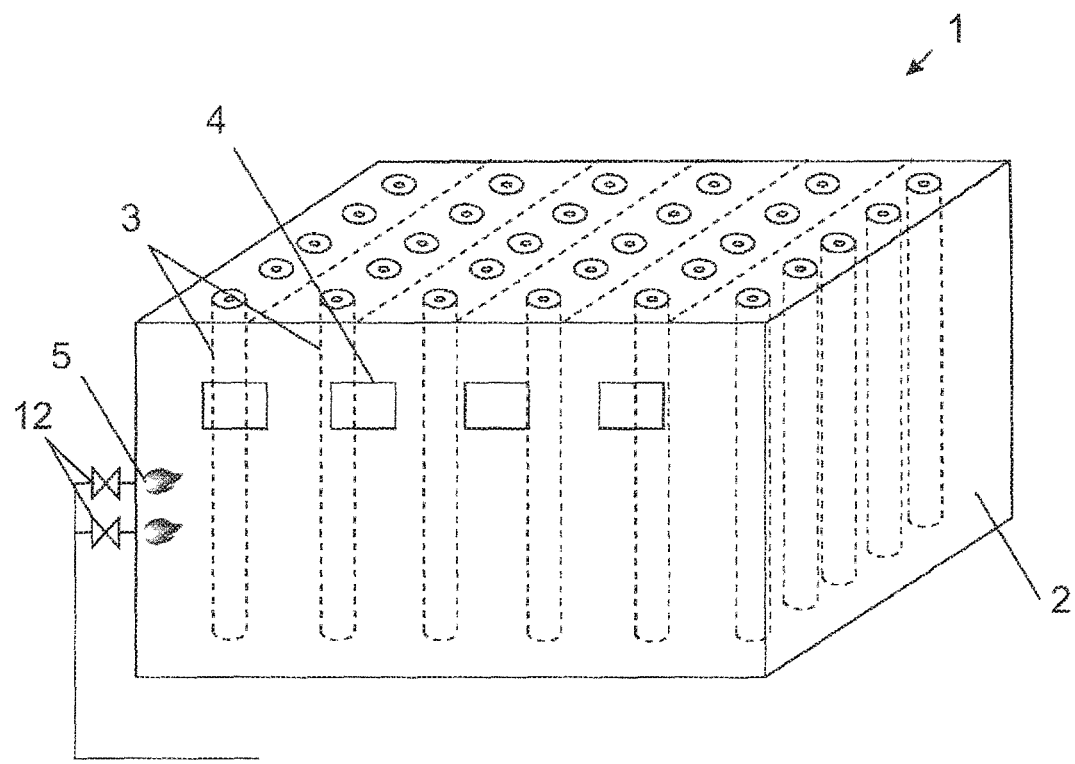
Figure 1
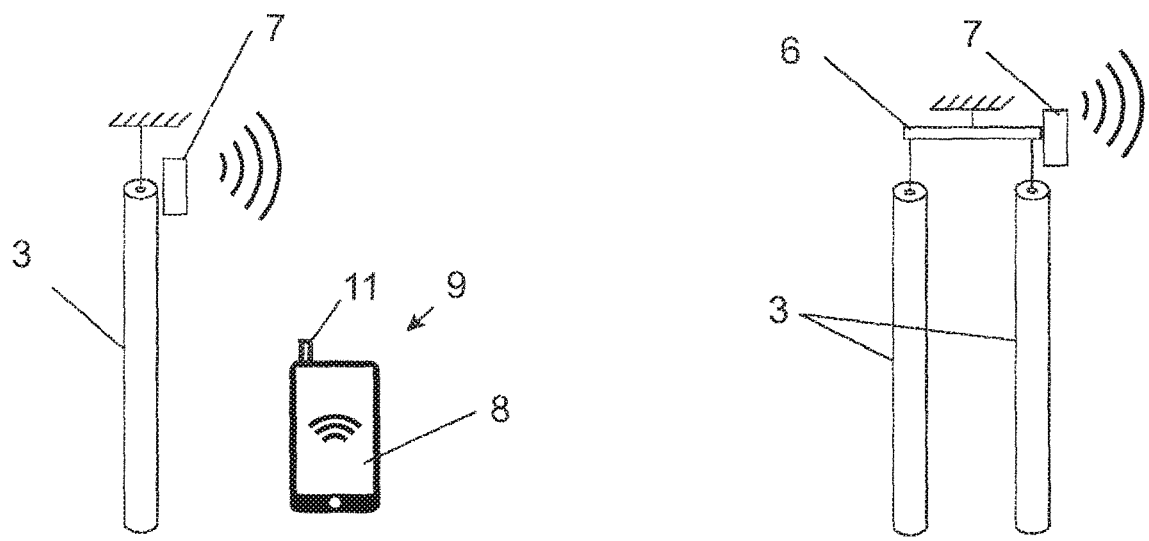
Figure 3
Figure 4

TUBE MONITOR AND PROCESS MEASUREMENT AND CONTROL IN OR FOR A REFORMER

THE FIELD OF THE INVENTION

The present invention relates to a tube monitor in or for a reformer such as, but not limited to a steam reformer that may be used in the production of methanol More particularly present invention relates to a tube monitor for overheat monitoring and/or protection and/or tube life prediction in or for a reformer such as, but not limited to a steam reformer that may be used in the production of methanol.

BACKGROUND TO THE INVENTION

The production process of methanol utilises a reformer stage. In the reformer stage, a natural gas and water mixture moves through heated tubes. Each tube contains nickel oxide (NiO) catalyst. This allows an endothermic reforming reaction to occur.

This process is also known as steam reforming (SR), sometimes referred to as steam methane reforming (SMR).

An external source of hot gas is used to heat tubes (reformer tubes) in which the catalytic reaction takes place. This reaction converts steam and lighter hydrocarbons such as methane into hydrogen and carbon oxides (syngas). The typical product of this process includes a mixture of $H_2+CO+CO_2$ $(+H_2O)$.

Reformer tubes are hollow tubes usually vertically suspended in a plurality of rows within a reactor (furnace enclosure). The furnace may be 15 m tall and 25 m square for example, housing some 700 tubes each around 12-14 m tall. The reformer tubes in a furnace are typically suspended by springs (or counterweights) off hangers that are located above the tubes.

Process operation temperatures see the tubes subjected to temperatures in the range of 900 and 950 degrees Celsius. The approximate optimum temperature for process efficiency is 930° C. A temperature lower than this will result in significant methane not being converted (methane slip) which may affect the efficiency of the plant operation. Conversely, temperatures higher than 930° C. will result in increased creep and reduced tube lifespan. Going from 930° to 950°, the tube life span is reduced by about half.

The lifespan of a tube is determined by their slow expansion at high temperatures (creep). Tubes creep both axially and diametrically. It is diametric creep that has the predominant impact on lifespan of the tubes. Operating the reformer too hot will shorten the life of the tubes and premature and unexpected failures can hence be costly. A leak in one tube can cause damage to the surrounding tubes. Currently each tube can cost around US$20,000. Further, replacing failed tubes requires a full plant shut down, potentially costing millions of dollars of lost production.

A common method for preventing SMR overheats is to measure energy in and energy out of the furnace to ensure excessive tube temperatures are not possible. Typically, overall temperature control in the furnace is achieved by regulating fuel gas pressure over all of the burners. Individual tube temperatures are controlled by fuel gas flow valves at each burner (via trimming). Accordingly, the trimming one burner may reduce the temperature in adjacent tubes, but that may then result in a peak of temperature elsewhere in the furnace.

This global approach does not always protect individual or small groups of tubes that can be overheated through operator error or equipment malfunction. This method of overheat protection is hence not fully effective, and burnouts of the reformer can, and do, sometimes occur. There are numerous reported failures using this method.

Measurement of the temperature of individual tubes is typically achieved by sight ports through the furnace wall. The sight ports are opened or able to be opened to allow infra red instrument access to determine and measure the temperature of tubes. However, opening the sight ports (without a glass window) allows cold air into the furnace and/or hot air out, and can cause a temperature change in tubes near the sight ports. Further, the accuracy of such measurements is low and the instruments may be reading a temperature variation of up to ±20°. Further still, such a manual approach to temperature measurement is very time-consuming (for example it may take between 40 minutes to an hour for an operator to make their way around the reformer measuring temperatures). As a result, the frequency of measurement is very low and may only occur at a few times in a 24 hour period.

In addition the sight ports do not allow for visibility of all tubes to be achieved because some tubes are obscured by the thickness of the furnace refractory lining. Therefore some tubes (particularly those around the perimeter) may not get monitored, as accurately, or at all. It has also been found that this type of temperature measurement is potentially quite variable between different operators, further affecting the accuracy and reliability of temperature data.

When adverse tube temperatures are detected by the infrared instrument, the tube temperature needs to be adjusted. Temperature control of the whole furnace is achieved by fuel gas pressure over all of the burners. Temperature of individual tubes can be controlled (trimmed) by dedicated gas flow valves to appropriate adjacent burners. A person who has observed, using the infra red instrument, one tube being of a high temperature may for example turn down the dedicated valve at an adjacent burner to reduce a tube's temperature. This process may be iterative and ongoing across all tubes in the furnace. This may in part be because adjusting a change in temperature of one tube may have an adverse effect on the temperature of another tube in the furnace.

The operations management preferably control the burners in an effort to maintain a relatively even temperature throughout the entire reformer by trimming. A well trimmed reformer will generally result in the highest efficiency of the reforming process.

Creep affects the life span of a tube. A typical lifespan of a tube is approximately 11 years. Creep is currently measured each time a plant is shut down. This may be roughly every 4 years. When the plant has been shut down, a device such as that shown in US2005/0237519 can measure the inside diameter of each tube along its length. This data can be compared to the tube when new. Where the degree of measured creep has exceeded a certain predetermined limit, a decision can be made to discard the tube and replace it with a new tube because of the statistical knowledge that the old tube is likely to fail in the next four year cycle.

However these data only become available when the plant is shut down at which point it is too late to order new tubes if there are insufficient spare tubes. The temperature data derived from individual tube growth measurements can be used to calculate the tube life consumed and hence allow sufficient tubes to be held for a planned plant shut down.

SUMMARY OF THE INVENTION

It may therefore be an object of the present invention to provide an improved method of real time monitoring temperature of a reformer tube.

It may also be an object of the present invention to provide a monitor to provide a real time indication of the temperature distribution of a reformer.

It may therefore be an object of the present invention to provide overheat monitoring/protection in real time of the temperature of a reformer tube or tubes within a reformer furnace.

It may also be an object of the present invention to provide a tube growth monitor and/or process measurement and/or control in or for a reformer and/or to provide the public with a useful choice.

According to a first aspect the invention broadly consists in our method of monitoring the temperature of a reformer tube in a reformer reactor comprising:
  measuring the length of said tube,
  calculating said temperature using said measured length.

According to a further aspect measuring said length of said tube comprises measuring the displacement of a hanger supporting said tube.

According to a further aspect said hanger supports a plurality of tubes.

According to a further aspect said measuring of length occurs over time, and
  a change in length over time is calculated.

According to a further aspect said measuring of length occurs over time, and
  a change in temperature over time is calculated from said change in length over said time.

According to a further aspect the invention broadly comprises a method of monitoring temperature distribution in a reformer reactor that includes a plurality of distributed tubes, comprising:
  using the method of any one or more of the previous clauses, to measure at least some of said tubes.

According to a further aspect the majority of said tubes in said reformer are monitored.

According to a further aspect said measuring the length of said tube is done autonomously by a displacement transducer.

According to a further aspect said displacement transducer transmits measurement data wirelessly to a receiver.

According to a further aspect said measured length and/or said calculated temperature is displayed in a manner reflecting the location of the tubes in the reactor.

According to a further aspect said display is a thermal contour map.

According to a further aspect said display is displayed on a mobile device.

According to a further aspect said display is used to trim one or more burners in said reformer reactor.

According to a further aspect said length measurements and said calculated temperatures are stored.

According to a further aspect said measured length and/or said calculated temperature is used to trim one or more burners in said reformer reactor.

According to a further aspect said method triggers a first alarm if said measured length or said calculated temperature exceeds a first predetermined threshold.

According to a further aspect said method triggers a second alarm if:
  said measured length or said calculated temperature of a predetermined number of tubes, exceeds a second predetermined threshold.

According to a further aspect in response to said alarm, one or more burners in said reactor are trimmed.

According to a further aspect in response to said second alarm a fuel gas flow into said reformer reactor is reduced.

According to a further aspect said first predetermined threshold is adjusted over time to compensate for expected creep in said tube.

According to a further aspect said second predetermined threshold is adjusted over time to compensate for expected creep in said tube.

According to a further aspect said method further comprises periodically calculating an indication of tube life consumed during said period using said measured length or said calculated temperature data.

According to a further aspect said method calculates a cumulative life consumed from said periodic calculation of tube life consumed.

According to a further aspect said method predicts a failure time based on said cumulative life consumed.

According to a further aspect said predicted failure time is used to plan a scheduled shutdown of said reformer reactor.

According to a further aspect said predicted failure time is used to plan replacement of said tube prior to a reformer shut down.

According to a further aspect said measured length data and/or said calculated temperature data is received by a controller, and
  said controller autonomously causes trimming of a burner fuel gas supply valve according to a predetermined algorithm.

According to a further aspect said measured length data and/or said calculated temperature data is received by a controller, and
  said controller autonomously causes a change in a fuel gas flow into said reactor according to a predetermined algorithm.

According to a further aspect said change in fuel gas flow into said reactor is a reduction.

According to a further aspect the invention consists in a reactor employing the method of any one of the preceding claims.

According to a further aspect the invention consists in a method substantially as herein described and with reference to any one or more of the drawings.

According to a further aspect the invention consists in a reactor substantially as herein described and with reference to any one or more of the drawings.

Accordingly, in a further aspect the present invention may broadly be said to be a method of monitoring and/or determining the temperature of a reformer tube in a reformer reactor, the method comprising measuring the change in length of the tube.

The present invention may also broadly be said to be a method of monitoring temperature distribution in a reformer reactor that includes a plurality of distributed tubes, the method comprising measuring the change in length of at least some of the tubes.

The present invention also may broadly be said to be a method of monitoring and/or determining the change in temperature of a reformer tube in a reformer reactor, the method comprising measuring the change in length of the tube.

The present invention also may broadly be said to be a method of monitoring and/or determining the change in temperature of a reformer tube in a reformer reactor, the method comprising measuring thermal expansions/contraction of the length of the tube.

The present invention also may broadly be said to be a monitoring and/or determining the change in length of a reformer tube in a reformer reactor as a correlation of a temperature change or changes of the tube.

The present invention also may broadly be said to be a monitoring and/or determining the temperature distribution in a reformer reactor that has a plurality of distributed reformer tubes, by measuring thermal expansion/contraction of a plurality of said reformer tubes.

Preferably the measuring is done by a gauge.

The present invention may also broadly be said to be a monitor for monitoring and/or determining temperature of a reformer tube in a reformer reactor, the monitor comprising a gauge capable of measuring the change in length of the tube.

The present invention may also broadly be said to be a monitor for monitoring and/or determining temperature distribution in a reformer reactor that has a plurality of distributed reformer tubes, the monitor comprising at least one gauge capable of measuring the change in length of a plurality of the tubes in the reactor.

Preferably a gauge is provided for each tube to be measured.

The present invention may also broadly be said to be a monitor for monitoring for overheat of a reformer tube in a reformer reactor by measuring a temperature dependent change in length said reformer tube.

The present invention may also broadly be said to be a monitor for monitoring for overheat of a reformer tube in a reformer reactor by measuring a temperature dependent change in length said reformer tube, the monitor comprising a gauge capable of measuring the change in length of a tube.

The present invention may also broadly be said to be a monitor for monitoring and/or measuring a change in temperature of a reformer tube in a reformer reactor, the monitor comprising a gauge capable of measuring the change in length of a tube.

Preferably the gauge is able to transmit change in length information.

Preferably the gauge is able to transmit change in length information to a receiver.

Preferably the receiver can cause change in length information to be displayed.

Preferably the receiver can cause change in length information to be stored.

Preferably the receiver can cause change in length information to be accumulated.

Preferably the monitor comprises a plurality of gauges, each dedicated to a tube of the reactor, each gauge able to transmit change in length information to a receiver.

Preferably the receiver can cause change in length information to be displayed for each tube.

Preferably the receiver can cause the change in length information to be displayed for each tube in a manner reflecting the location of the tubes when seen in plan view, in the reactor.

Preferably the display relies on colour to show change in length information of each tube.

Preferably the display allows a person to determine the temperature of each tube in the reactor.

Preferably the reformer as herein above described is a steam reformer.

Preferably the steam reformer is used in the process of producing methanol.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 1 is a simplified view of a reformer reactor,

FIG. 3 is a schematic view of a suspended tube, and FIG. 4 is a schematic view of a pair of tubes suspended on a common hanger.

DETAILED DESCRIPTION

Over Heat Protection and Process Optimisation

Figure 2:
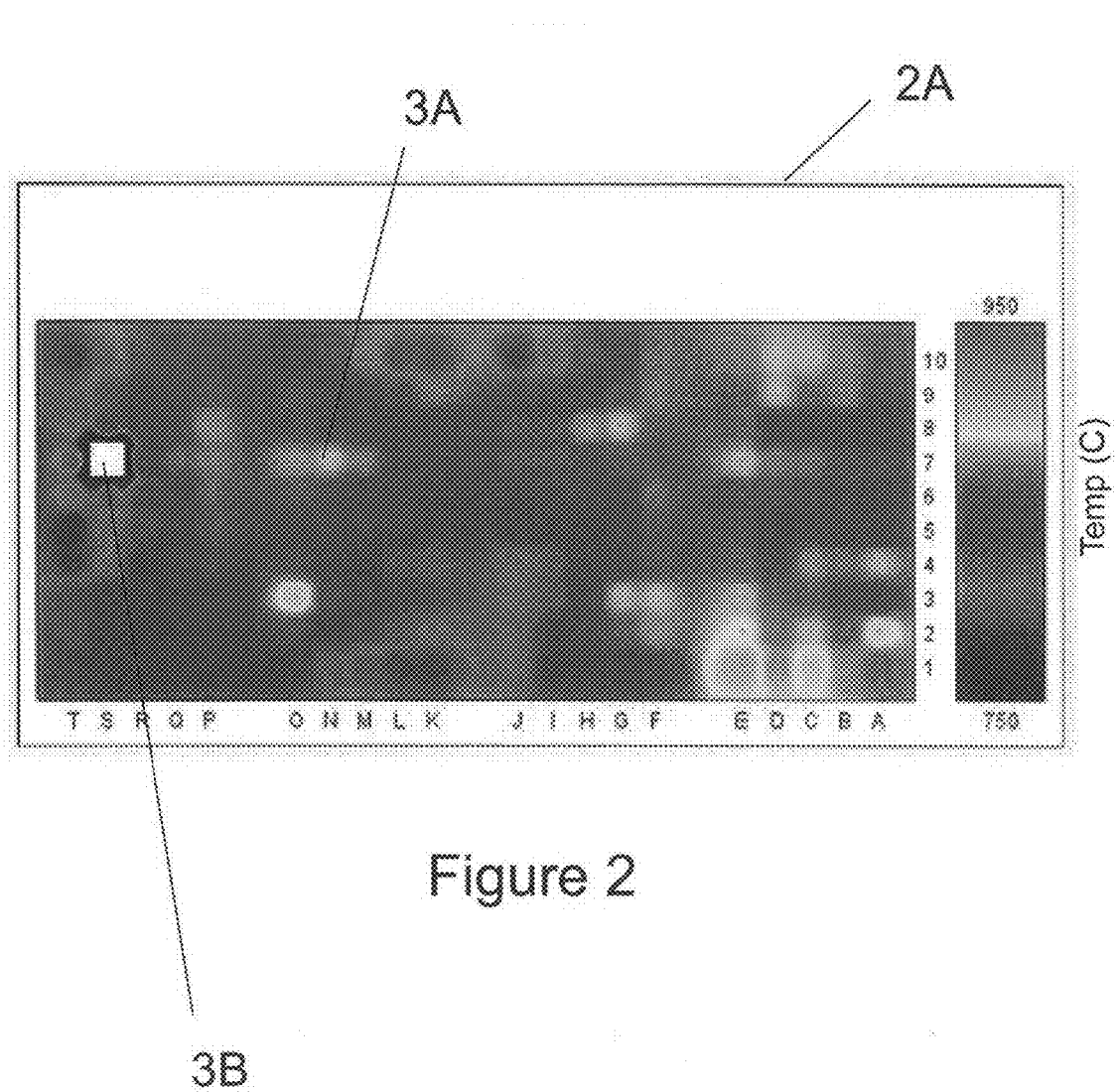
FIG. 2 is a thermal image representation of temperature distribution of the reformer reactor as seen in plan view.

The present invention includes a method and apparatus for monitoring for overheat of individual tubes and/or of temperature distribution in a reformer reactors such as a steam reformer, preferably but not solely for the process of making methanol. Alternative applications of this invention may be in the reformer stage of hydrogen or ammonia.

By way of example, a reactor 1 is shown in FIG. 1 and includes an enclosure 2 that houses a plurality of reformer tubes 3. For the production of methanol, a natural gas and water mixture moves through heated tubes. Each tube contains nickel oxide (NiO) catalyst. This allows an endothermic reforming reaction to occur. Heat is typically provided to the reformer furnace via a number of burners 5. For example, a burner may be located near every tube, or a group of tubes such that there is approximately 1 burner per 4 to 6 tubes on average.

The reactor may include sight ports 4, as described above for inspecting the reformer and/or measurement of reformer tube temperature.

To measure the temperature of the tubes, it is not possible to obtain a direct measurement due to the extremely high temperature within the reformer. For example, the tubes are at a temperature typically in excess of 900° C., while the flue gas may exceed 1000° C. Further, the nature of the reforming reaction, and the distribution of heating burners etc., can result in a complex distribution of temperature along the length of the tubes and through the walls of the tubes.

In order to obtain an indicative measure of the temperature of the tubes, the present invention employs a measuring gauge or displacement transducer. This measuring gauge 7 will measure the thermal expansion and contraction of a tube, or each tube in the reactor. More particularly, in the most preferred configuration, the elongation of the reformer tubes is directly measured by the measuring gauges.

In a preferred embodiment a number of reformer tubes may be hung off a single hanger 6, and a single measuring gauge 7 utilised to measure the change in length due to thermal expansion and contraction of a plurality of tubes 3 hung from the same hanger. For example, a single hanger 6 may support a pair of tubes, or four tubes, or more. This configuration has an advantage of reducing the number of measuring gauges required.

It is to be understood that references in this specification and claims to "measuring a reformer tube", is intended to encompass the measuring of a single tube, or a plurality of tubes hanging from a single support. Similarly, the term "measuring" and/or "measurement" is intended to encompass the described configuration of measuring the longitudinal extension of a single tube, or a group of tubes, supported on a single hanger.

Accordingly, each gauge 7 arranged in this way measures an 'average' of sorts, of the change in length of all the tubes on the hanger. From this change in length, a normalised indicative temperature can be calculated. It is to be understood that references to measuring "temperature" in this specification and claims, is intended to mean measurement of the 'normalised' or 'indicative' temperature as described herein.

Further, throughout the reformer, the number of tubes supported by each hanger may be different. For example, some hangers may support four tubes while others support a pair of tubes or only one tube.

It has been found that measuring the change in length of a group of tubes works well, particularly when those tubes are in close proximity to each other and experience a similar environment within the reformer furnace.

Alternatively, each tube 3 in the reformer may be instrumented so that its change in length can be measured. Such use may be to display, length, a change in length of the tube directly, or a calculated temperature based on the measured displacement data. It is most preferred that every tube in the reformer reactor as instrumented either individually, or as part of a group of tubes on the same hanger for example. Alternatively, only a selection of tubes may be instrumented throughout the reformer. In this situation, it is preferred that the tubes are distributed throughout the reformer. It is also preferred that the majority of tubes are instrumented (either individually, or as part of a group as described).

It is most preferred that the measurement gauges 7 are configured to provide data in real time with an appropriate sample interval. For example, a sample rate of between 1-3 data points per minute, and one data point per 24 or 48 hours, is preferred. For a relatively slow moving process, sample rates faster than 1 per minute, are not likely to significantly increase the benefit. Each measurement gauge is configured to communicate with a computerised monitoring and/or control system to receive, record, and store the measured data. The measuring devices are preferably configured to communicate wirelessly with one or more receivers, which can relay the information back to a monitoring system.

The use of the change in length of the tube to calculate a normalised temperature, will result in an approximation of temperature across the entire length of the tube, rather than a specific accurate temperature at any given point. It will be appreciated that the present method can be supplemented by more traditional inspections of the reformer tubes (via pyrometer for example), to further identify hotspots along the length of a reformer tube, that requires remedial trimming.

It has been found however, that the 'approximation' of tube temperature by measuring the change in length of the tube (or tubes on a hanger) is more than sufficient for the present purposes. In particular, this method of measuring the change in length of the tubes has been found to be sensitive enough to detect abnormal tube heating and/or cooling. Such abnormal temperature, can affect the efficiency of the process, or in the case of overheating, if left unchecked can significantly affect the life of the reformer tube(s), and in worst-case scenarios may lead to reformer burnout.

The measuring gauge may be a laser distance gauge or another means. It may for example measure the displacement of one end of a tube (or hanger supporting a multitude of tubes), the other end being held fixed relative so some datum that the gauge is fixed to also. As a tube heats up, it lengthens. This is measured by the gauge 7. This length measurement is then used subsequently to calculate a temperature using techniques known in the art. For example, an equation for linear thermal expansion tells us that the change in length of the tube is directly proportional to the change in temperature. However, it is known that the coefficient of growth is not constant, but rather changes with temperature. Therefore, a linear approximation may be made using a coefficient of growth appropriate for typical operating temperatures.

Alternatively, a non-linear correlation between growth and temperature can be used, as is known.

Based on intervening calculations/processing, the measurement may additionally be represented graphically. Such a graphic display may be in the form of a thermal image map as shown in FIG. 2. Thermal 'maps' have been found to provide an excellent visual indication of temperature distribution within the reformer, as well as 'hot spots' and/or 'cold spots'.

The Thermo map is useful in the operations control room and/or may also be available on a mobile device. Further, a real time live Thermo map may be wirelessly (or otherwise) transmitted to a tablet 9 for example. The trimmer can then take the tablet 9 which has a display screen 8 and a receiver 11 around the furnace and use the information (graphically displayed on screen 8) and/or otherwise displayed, to trim the burner valves 12. The use of real-time information at the time of trimming allows the trimmer to quickly see the effect of the trimming changes made. As a result the reformer efficiency may be improved.

The map is indicative of the temperature, derived from the gauge, of each tube at locations corresponding to where each tube exists in the reformer reactor. The area 3A is for example an area corresponding to where a reformer tube is located in the reactor. The image map boundary 2A being indicative of the enclosure 2 of the reactor as seen in plan. For trimming purposes, it is very helpful to have information about the location within the reformer reactor of any hotspots or cold spots. More particularly, it is necessary to know which burners to trim in order to normalise those hotspots and/or cold spots.

Any false reading may show up as an area 3B. Such thermal maps, can be very useful for staff in operations to visualise how the reformer is behaving.

With the invention every tube (or group of tubes instrumented) is being measured in real time. This can allow for fast detection of reformer tubes overheating or cooling. The operations management preferably control the burners in an effort to maintain a relatively even temperature throughout the entire reformer by trimming. A well trimmed reformer will generally result in the highest efficiency of the reforming process, by eliminating cold spots which contribute to methane slip. Consequently, a real time data stream of normalised temperature readings is an extremely valuable tool for keeping the reformer trimmed appropriately.

In particular, the present system reduces the reliance on significant manpower and time delay involved in manually measuring reformer tube temperatures with a pyrometer through sight ports, and then adjusting the burner trims appropriately. The present system enables trimming decisions to be made at any time, and as often as is considered necessary, without the need to first execute the time-consuming process of a manual temperature shoot (which make typically take approximately an hour and be done only a few times in a 24 hour period). It is considered that the present system is an important step, because it enables that least some burner trimming to be automated as an alternative to manual trimming.

The present method allows the reformer to be run with higher efficiency levels. As noted previously, traditional pyrometer temperature measurement can still be used to identify hotspots which may not be picked up by the present system so that trimming adjustments can be made accordingly.

Measuring change in temperature can also allow for early warning of possible overheat. Small levels of overheat in individual tubes can have a significant detrimental effect on the life of that tube. Further, if a more general and severe overheating situation occurs throughout the reformer or in a significant region of the reformer, there is a risk of burnout.

The system may include an alarm that triggers when a certain predetermined limit is reached. For example, if one or more reformer tubes are found to exceed a predetermined limit, an alarm can be triggered to inform the operations control that action is required. Adjustment of the temperature of the tube can then be effected, by trimming the burners 5 in the vicinity of the overheated tube or tubes, or if necessary more aggressive action.

The alarm predetermined limit may be a distance i.e. a length of the tube (or group of tubes on a single hanger), that if reached, will trigger the alarm.

Alternatively, the predetermined alarm limit, may be a temperature i.e. a calculated normalised temperature of the tube (or group of tubes on a single hanger), that if reached will trigger the alarm.

It is envisaged that each tube (or each group of tubes on a single hanger), may have a different alarm trigger calculated and applied. The different threshold may be based on the creep history experienced by that tube (or group of tubes), or any other reason why the target temperature for a tube, may be different from another tube.

Further, the alarm predetermined limit may be adjusted over time to reflect the expected creep of the tubes 'normal' length over time. That is, it is to be expected that over the course of several years of service, the length of a tube at a given temperature will change due to creep. The amount of creep can be relatively accurately predicted over time using known techniques, and therefore the alarm threshold limits can be periodically altered to reflect this expected change. In particular, after a reformer shut down, accurate actual measurements can be taken of the tubes to verify the amount of creep damage that is actually occurred. This information can be used to recalibrate the alarm trigger threshold for the tube.

Real-time measurement of an indicative temperature (for each tube or for a number of groups of tubes), allows the operations team to react much more quickly to situations which could lead to partial or full burnout of the reformer. As a result, the risk of such a catastrophic event (which can typically cost tens of millions of dollars), can be significantly reduced. This reduction of risk and have very significant positive effects on the expenses and profitability of a reformer operation.

It is envisaged that a number of predetermined alarm limits may be implemented at differing degrees of temperature abnormality. For example, a first alarm may be triggered if a tube (or group of tubes) reaches a first predetermined limit substantially as described above. The first predetermined limit may represent a threshold where the operations team should consider trimming the appropriate burners when the next trimming cycle is due for example.

In addition, a second alarm may be triggered at a second predetermined limit, that represents a higher threshold where action should be taken more quickly to improve the efficiency of the reformer and/or avoid unnecessary creep damage caused by overheated.

Further, a third alarm may be triggered at a third predetermined limit that represents the need for urgent drastic action to prevent the reformer from entering a high risk burnout scenario. For example, regulating the main gas pressure down, is a typical response to a dangerous event such as a number of tubes, reaching attempt above a predetermined threshold. A fourth alarm criteria is envisaged to trigger if a predetermined number of tubes (or a predetermined percentage of the tubes in the reformer) exceed a predetermined temperature threshold.

It is envisaged that any of the alarms described may be visual or audible. For example, a light may flash or an audible sound may be generated. Typically the alarms would increase in severity due to the nature of the alarm event.

In particular, a visual alarm overlaid on the thermal map is envisaged where one or more tubes indicating a temperature above a predetermined threshold, may flash for example. This would draw attention to the relevant locations on the thermal map, for remedial action.

Tube Life Management

Data can also be collected of temperature profile each tube has been subjected to over time. This may be able to be given an average value based on average temperature the tube has been subjected to for a given duration by virtue of its elongation measures. A cumulative value can then show the degree of creep that the tube has been subjected to and therefore a real live measure of each individual tube's likely remaining life span may be able to be determined. The life of a tube is typically measured by the change in diameter of the tubes. For example, it may be considered that a tube has reached the end of its life when the diameter has increased by a predetermined percentage (e.g. 3% increase in internal diameter). Known techniques for correlating change in tube length and/or tube temperature history to tube diameter creep can be utilised. These techniques may be based on models and/or empirical correlations.

For example, the monitoring system may periodically calculate a measure of tube life consumed based on the cumulative temperature data over time experienced for each tube (or group of tubes instrumented on a single hanger). This information can then be used to determine likely failure time is for the tubes.

It will be appreciated that this data is extreme is useful for logistical planning purposes around scheduled shutdowns etc.

There are a number of known techniques in the art for correlating expected failure and/or life consumed, based on environmental conditions experienced by structures subjected to high pressures and temperatures. However, up until now the estimates can be unreliable because of the quality of the data available to feed into the predictive models. In particular, the quality of the temperature data over the life of the reformer tubes has been lacking. It is known that the creep life of reformer tubes is extremely sensitive. For example, a 20° C. increase in temperature (i.e. 930° versus 950°) will approximately halve the expected life. Therefore, even short periods of overheating can significantly reduce life expectancy. Short-term temperature fluctuations are not necessarily even picked up by traditional manual temperature measurement techniques. As a result any predictive technique based on that data will underestimate the life consumed, which could lead to early failure, and an unscheduled shutdown of the reformer.

The present invention greatly improves the frequency of temperature data available for individual tubes (or groups of tubes) over its entire life. Accordingly, the predictive models which correlate temperature data to stress, and creep, are able to deliver significantly improved results.

The invention claimed is:

1. A method of monitoring the temperature of a reformer tube in a reformer reactor comprising:
    measuring the length of said tube autonomously by a displacement transducer, and
    calculating said temperature using said measured length.

2. The method of monitoring as claimed in claim 1, wherein measuring said length of said tube comprises measuring the displacement of a hanger supporting said tube.

3. The method of monitoring as claimed in claim 2, wherein said hanger supports a plurality of tubes.

4. The method of monitoring as claimed in claim 1, wherein said measuring of length occurs over time, and
    a change in length over time is calculated.

5. The method of monitoring as claimed in claim 1, wherein said measuring of length occurs over time, and
    a change in temperature over time is calculated from said change in length over said time.

6. A method of monitoring temperature distribution in a reformer reactor that includes a plurality of distributed tubes, comprising:
    using the method of claim 1, to measure at least one of said tubes.

7. The method of monitoring of claim 6, wherein more than half of said tubes in said reformer are monitored.

8. The method of monitoring of claim 5, wherein said displacement transducer transmits measurement data wirelessly to a receiver.

9. The method of monitoring of claim 1, wherein said measured length and/or said calculated temperature is displayed in a manner reflecting the location of the tubes in the reactor.

10. The method of monitoring of claim 9, wherein said display is a thermal contour map.

11. The method of monitoring of claim 9, wherein said display is displayed on a mobile device tablet.

12. The method of monitoring of claim 9, wherein said display is used to trim one or more burners in said reformer reactor.

13. The method of monitoring of claim 1, wherein said length measurements and said calculated temperatures are stored.

14. The method of monitoring of claim 1, wherein said measured length and/or said calculated temperature is used to trim one or more burners in said reformer reactor.

15. The method of monitoring of claim 5, wherein said method triggers a first alarm if said measured length or said calculated temperature exceeds a first predetermined threshold.

16. The method of monitoring of claim 15, wherein said method triggers a second alarm if:
    said measured length or said calculated temperature of a predetermined number of tubes, exceeds a second predetermined threshold.

17. The method of monitoring of claim 15, wherein in response to said alarm, one or more burners in said reactor are trimmed.

18. The method of monitoring of claim 16, wherein in response to said second alarm a fuel gas flow into said reformer reactor is reduced.

19. The method of monitoring of claim 15, wherein said first predetermined threshold is adjusted over time to compensate for expected creep in said tube.

20. The method of monitoring of claim 16, wherein said second predetermined threshold is adjusted over time to compensate for expected creep in said tube.

21. The method of monitoring of claim 1, wherein said method further comprises periodically calculating an indication of tube life consumed during said period using said measured length or said calculated temperature data.

22. The method of monitoring of claim 21, wherein said method calculates a cumulative life consumed from said periodic calculation of tube life consumed.

23. The method of monitoring of claim 1, wherein said measured length data and/or said calculated temperature data is received by a controller, and
    said controller autonomously causes trimming of a burner fuel gas supply valve according to a predetermined algorithm.

24. The method of monitoring of claim 1, wherein said measured length data and/or said calculated temperature data is received by a controller, and
    said controller autonomously causes a change in a fuel gas flow into said reactor according to a predetermined algorithm.

25. The method of monitoring of claim 24, wherein said change in fuel gas flow into said reactor is a reduction of the fuel gas flow.

* * * * *